Figure 1:
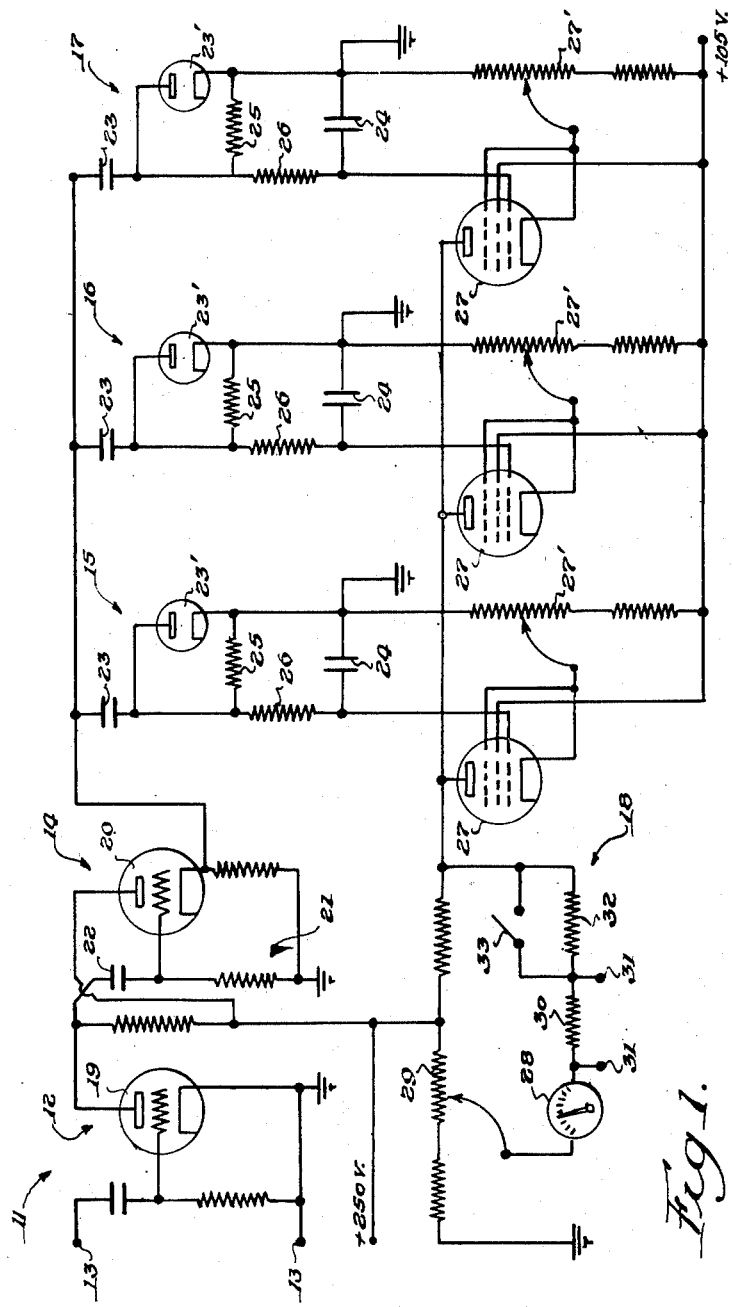

Inventor
John E. Jacobs
By: Spencer, Marzall, Johnston & Cook
Attys

May 15, 1951  J. E. JACOBS  2,552,854
LOGARITHMIC RATEMETER
Filed June 15, 1948  2 Sheets-Sheet 2

Inventor
JOHN E. JACOBS
By:- Spencer, Marzall, Johnston & Cook
Attys.

Patented May 15, 1951

2,552,854

UNITED STATES PATENT OFFICE 2,552,854

LOGARITHMIC RATEMETER

John E. Jacobs, Evanston, Ill., assignor to General Electric X-Ray Corporation, Milwaukee, Wis., a corporation of New York Application June 15, 1948, Serial No. 33,075

6 Claims. (Cl. 250—27)

The present invention relates in general to meters and metering, and has more particular reference to an electrical metering system having a logarithmic response characteristic.

Electrical metering systems, especially those of the sort adapted for counting purposes, are commonly employed, as for example in connection with impulse generating equipment in order to translate electrical impulses impressed thereon and apply the same to operate visual indicators or graphic recorders in accordance with the number of impulses impressed upon the system, to thus meter the impulses, such apparatus ordinarily having straight-line response characteristics, whereby the indicator or recorder is operated in direct proportion to the number of metered impulses.

Where metering equipment is used with impulse generators, such as Geiger counters, for measuring impulses which may be applied at any rate, within a wide range rate, straight-line response characteristics result in overloading the mechanism in its upper registers. For example, where impulses per unit of time are impressed at frequencies ranging between zero and an exceedingly large number of the order of several thousand, in a system having straight-line response characteristics, the response movement of the visual indicator, or of the recording member actuated by the system, will have to be excessively large in order to afford reasonable accuracy in the lower registers while also including the entire counting range of the apparatus. While it is desirable to have relatively large deflection of the indicator or recorder, in the lower register of the apparatus, in order to accurately indicate or record the count, at low impulse frequencies, it is ordinarily not necessary to preserve the same proportional deflection or movement of the indicator or recorder in the upper register. In the lower register, for example, it may be desirable to accurately distinguish each unit counting rate, as between zero and, say, one or two hundred per second. Between the range from, say, one hundred to one thousand impulses per second, it may be sufficient, for practical purposes, merely to indicate or record the count by tens or perhaps by fives. In the upper register, as for example, in the range between one and ten thousand, it may be entirely satisfactory to count impulses by fifties, or hundreds. In other words, while the apparatus should be able to distinguish between small counting units in the lower register, it is ordinarily sufficient in the upper registers that the apparatus distinguish merely between appreciably larger counting units, the difference between five units and six units (20%) being proportionately much greater than the difference between, say, fifty-five hundred and fifty-six hundred units (1.8%).

An important object of the present invention is to provide a novel electrical metering system particularly adapted for impulse counting purposes and adapted to receive electrical impulses at the input side of the system, at any impulse rate within a wide operating range of the apparatus, and to deliver corresponding energy at the output of the system, for the operation of the indicator or a recorder, or for other purposes wherein the response characteristic of the metering system within its range from zero to maximum is other than a straight-line function, the response in the upper register being relatively smaller than in the lower registers of the equipment.

A further object is to provide apparatus of the character mentioned, wherein the response is in accordance with a predetermined mathematical function; a still further object being to provide a metering system, the response characteristic of which comprises a logarithmic function.

Another important object is to provide a metering system in which electrical potential proportional to the number of impulses received may be applied to a counting circuit having a logarithmic response characteristic; a further object being to operate the system by charging a condenser in proportion to the number of impulses impressed on the system, and to utilize the condenser to control an electron flow valve having logarithmic response characteristics.

Another important object is to meter impulses by charging condenser means in proportion to the number of impulses applied on the metering apparatus and by then measuring the condenser charge to determine the number of impulses applied on the system; a further object being to measure the condenser charge by applying it as a control bias on an electron flow valve; a still further object being to use a valve having a logarithmic response characteristic.

Another object is to provide a time factor in the counter circuit by connecting the condenser so that it will discharge continuously, so that the charge on the condenser at any instant is a function of the rate at which impulses to be counted are at that instant being impressed on the system.

Another important object is to provide apparatus of the character mentioned, including wave shaping means for creating an impulse wave of predetermined shape, amplitude and duration in response to the application of an electrical impulse to be counted on the apparatus, in order thus to provide pulsations of uniform amplitude at the output of the shaping means, whereby to prevent false counting in the system, it being understood that successive impulses applied to the system for counting, within limits, may be of variable shape, duration, and intensity.

Another important object is to provide means for amplifying the shaped impulses to a form in which they are adapted to operate cathode follower means forming a low impedance pulse source to prevent succeeding stages of the system from loading back on the shaping circuit.

Another important object is to provide a system embodying several pulse rate responsive circuits, in parallel relation, to which the shaped and amplified impulse waves are delivered for counting, these pulse rate responsive circuits being adjusted to become inoperative at different counting rate levels so that only one of said circuits will be operable to count impulses in each of several counting ranges; a further object being to utilize three circuits to cover the range up to 10,000 counts per second, one circuit being operable in the low register, another in the intermediate register, and still another circuit being operable to count in the upper register of the system, all of the circuits being connected to relay the count to an output portion of the system for delivery thence to a suitable indicator or a recorder.

Another important object is to utilize an electron flow valve having a control grid in each of the pulse rate responsive circuits and regulated in such fashion that the valve is driven into cut-off when the counting rate exceeds a preselected value, so that as the counting rate increases from zero to a maximum, the pulse rate responsive circuits will be successively driven into cut-off position.

Another important object is to employ a separate timing circuit in association with each electron flow valve operable to prevent delivery of energy in the high range pulse rate responsive circuits, so long as a pulse responsive circuit operable in a lower range remains in operating condition prior to cut-off, whereby each of the pulse rate responsive circuits operates automatically within its corresponding counting range.

The foregoing and numerous other objects, advantages, and inherent functions of the invention will become apparent as the same is more fully understood from the following description, which, taken in conjunction with the accompanying drawings, discloses a preferred embodiment of the invention for the purpose of demonstrating the same.

Figure 2:
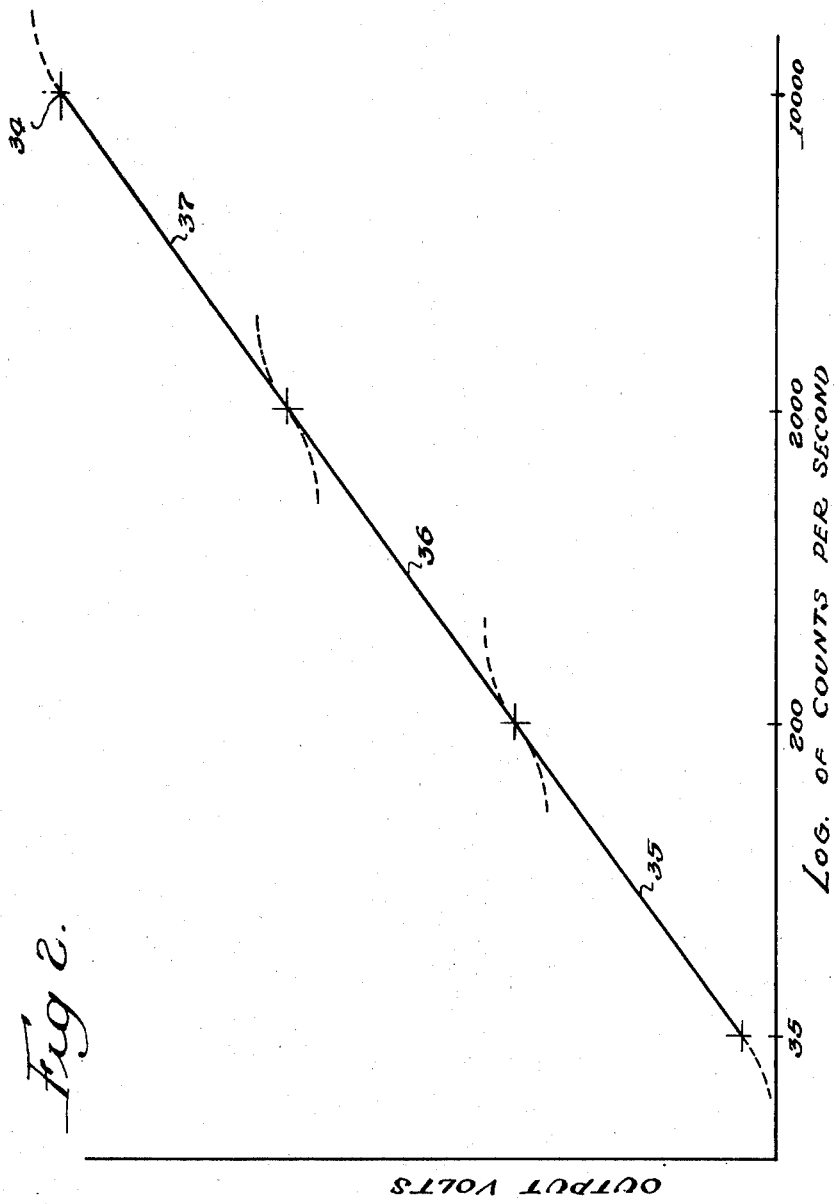

Referring to the drawings:

Fig. 1 is a diagrammatic representation of a counting system embodying the present invention; and Fig. 2 is a graphical representation of the performance of the system shown in Fig. 1.

To illustrate the invention, Fig. 1 of the drawing shows a circuit diagram of a ratemeter, embodying the present invention and comprising a metering system 11 adapted to function over a counting range between zero and ten thousand impulses per second, although it will be apparent that the invention is not necessarily limited to the range specified.

The system 11 comprises a shaper circuit 12, to which impulses to be counted may be applied at input terminals 13; a cathode follower circuit 14, with which the shaper circuit is controllingly connected; pulse rate responsive circuits 15, 16, and 17, in parallel relationship, and with which the cathode follower circuit 14 is controllingly connected; and an output circuit 18, with which the pulse rate responsive circuits 15, 16, and 17 are controllingly associated.

The metering system of the present invention functions by converting negative pulses, applied between the input terminals 13, to positive pulses of predetermined amplitude and duration regardless of the rate at which pulses are impressed at the input terminals 13. These converted pulses are applied, as rapidly as they are received, to charge condensers 24, one in each of the circuits 15, 16, and 17 which operate to deliver energy to the output circuit 18, in logarithmic proportion to the charge prevailing at the condensers 24, for the operation of a visual indicator or a suitable recorder or other energy actuated device. This is accomplished by means of electron flow tubes 27, one in each circuit, which have logarithmic response characteristics of output current in the plate circuits thereof to control grid potential. The circuits 15, 16, and 17, in the illustrated embodiment, serve respectively to count and correspondingly energize the output circuit at counting rates of 10–200; 200–2,000; and 2,000–10,000 counts per second, the response characteristic of each of the circuits 15, 16, and 17 being logarithmic, substantially throughout its operating range.

To this end, operating energy is supplied to the grids of the tubes 27, each through the connected condenser 24 and an integrating circuit including resistors 25 and 26, the integrating circuits being connected with the source of converted impulses, each through a corresponding coupling condenser 23. The resistors 25 are so selected as to determine the rate at which the associated condensers 24 become charged to a degree sufficient to drive the connected tube 27 to cut-off, so that each tube will be cut off at the upper limit of its counting range. The resistors 26 are selected to form integrating circuits with the condensers 24, the function of the integrating circuits being to minimize variations in the voltage produced by the pulses arriving at random time intervals. The values of the resistors 26 and of the condensers 24 are selected to give optimum performance within the counting ranges of the circuits 15, 16, and 17, whereby effectively to control a meter 28 with which the plates of the tubes 27 are connected in parallel relationship.

The shape of the positive pulses of uniform width which are delivered to the circuits 15, 16, and 17 is preferably substantially square. This is accomplished in the shaper, amplifier, and cathode follower circuits 12 and 14. The negative impulses of uniform width applied between the input terminals 13 serve to control the grid of an amplitude leveler tube 19 to produce impulses of rectangular wave form in the plate circuit of the tube 19. These impulses are delivered to a cathode follower tube 20, with which the shaper tube is controllingly connected and which forms a part of the circuit 14. The tube 20 provides shaped positive impulses of desired uniform amplitude and width or duration for the operation of the circuits 15, 16, and 17, the desired square wave form of the impulses delivered by the shaper circuit being accomplished by controlling the shaper tube 19 so that it is driven into cut-off, at a voltage substantially less than that applied at the input terminals 13.

The cathode follower tube 20 serves as a low impedance source of impulses, thus preventing the succeeding counting stages 15, 16, and 17 from loading back upon the shaper circuit 12. The output of the tube 20, operating through coupling condensers 23, charges the condensers 24, which operate the pulse rate responsive circuits 15, 16, and 17.

The shaped pulse delivered by the shaper tube 19 through the condenser 22 and the differentiator circuit 21 to the cathode follower 20 assures pulses of uniform amplitude for delivery on the circuits 15, 16, and 17.

To simplify biasing arrangements in the counting circuits 15, 16, and 17, the polarity of pulses delivered from the circuit 14 is reversed, by means of a charging diode 23' in each of the circuits 15, 16, and 17. The diode, in each circuit, operates to reverse the impulse received through its associated condenser 23, and to apply the reversed pulse to charge the capacitor 24, through a time constant circuit comprising resistors 25 and 26.

The resistor 25 serves to determine the rate at which the condenser 24 becomes charged, that is to say, the time interval required to accumulate a charge on the condenser sufficient to drive its associated electron flow device to cut-off. The resistors 25 in the circuits 15, 16, and 17 are of unlike value of resistance, the resistors in the circuits 15, 16, and 17 being of progressively lower value. The circuits 15, 16, and 17 may be adjusted, as by the resistors 27', so that the valve 27 of the circuit 15 is cut off at a voltage corresponding with 200 c. p. s., the valve 27 of the circuit 16 at a voltage corresponding with 2,000 c. p. s., and the valve 27 of the circuit 17 at a voltage corresponding with 10,000 c. p. s.

The plate current in each tube 27, within its operating range, is an approximate logarithmic function of the voltage on its control grid. The plate circuits of the tubes 27, of each circuit, are connected in parallel with the output circuit 18, which includes a milliammeter 28. This meter serves to furnish visual indication of the counting rate as determined by operation of the system. The plate circuits of the tubes 27 of the circuits 15, 16, and 17 are connected in parallel so that each circuit, when in operation, contributes to the output delivered in the circuit 18.

Inasmuch as condensers 24 are charged through diodes 23' in response to energy pulses delivered by the tube 20, they will, for all practical purposes, receive the same charge for each pulse delivered by the tube. During the interval between pulses, the charge on the condensers 23 may leak off through the resistors 25, thus serving to charge condensers 24 through their respective resistors 26. The diodes 23' are effectively open circuited because of the polarity of the voltage produced by the energy pulses on condensers 23. Inasmuch as the diodes 23' are removed from the circuit, the effective time constant associated with condensers 24 is determined by the values of the resistors 25 and 26, the resistors 26 being chosen so as to contribute the major portion of this time constant. The selection of resistors 25 determines, to a large extent, the rate of discharge of condensers 23, following termination of a pulse received from tube 20. This is because the resistors 26 are of larger ohmic value than resistors 25. By controlling the rate of discharge of the condensers 23, the charge applied to the condensers 24, through their resistors 26, per pulse emitted from the tube 20, can be controlled. It is thus possible by proper selection of the values of resistors 25 and 26, and of the condensers 24, to cause the condenser 24 of circuit 15, for example, to receive a greater charge, at a given pulse rate, than the charge produced on the condensers 24 in the circuits 16 and 17, one of the important objects of the present invention being the elimination of the necessity of manually changing the values of the integrating circuit parameters at various pulse rates in order to maintain indicator fluctuations substantially constant.

In the output circuit 18 a potentiometer 29 may be provided to balance out the static current component of plate current in the tubes 27 in order to make the meter 28 read directly rather than in slide back fashion. The potentiometer 29 thus serves as a zero adjustment for the meter. By applying a resistor 30 in the output circuit in series with the indicating meter 28, output voltage may be provided between output terminals 31 connected to the opposite ends of the resistor 30 for the purpose of operating a recorder or other apparatus which it may be desired to operate in accordance with the performance of the metering system. The meter 28, of course, may be calibrated with a logarithmic scale in order to indicate the counting performance of the system.

In Fig. 2 of the drawings is shown a performance graph of the apparatus, wherein the curves 35, 36, and 37 respectively represent the performance of the counting circuits 15, 16, and 17. It will be seen that the circuits have a logarithmic response in the straight-line portions of the curves, during which the circuits are adjusted for operation. Each circuit thus operates in succession through the range of the equipment so that the over-all response forms a continuous straight-line comprising the three sections 35, 36, and 37.

It will be seen that the response below, say, 35 c. p. s. is not logarithmic. In this range, which is not usually of importance, the response is linear and the scale of the meter 28 in that relatively small zone may be specially calibrated, if desired.

It will be seen, also, that above 10,000 c. p. s. the response of the circuit 17 becomes linear. The output circuit 18 may be provided with a resistor 32 with a cut-out switch 33 in series with the meter 28, so that the system may be calibrated with the resistor connected in the circuit. After calibration the resistor may be cut out by closing the switch 33. This results in the calibrated system reaching its maximum scale deflection of 10,000 c. p. s., as at 34 in Fig. 2, while still within its logarithmic response range.

It is thought that the invention and its numerous attendant advantages will be fully understood from the foregoing description, and it is obvious that numerous changes may be made in the form, construction and arangement of the several parts without departing from the spirit or scope of the invention, or sacrificing any of its attendant advantages, the form herein disclosed being a preferred embodiment for the purpose of illustrating the invention.

The invention is hereby claimed as follows:

1. A ratemeter system comprising impulse shaping means to form shaped impulses of uniform amplitude in response to energizing impulses applied on the system, a plurality of integrating circuits connected to said impulse shaping means, each of said integrating circuits embodying a separate condenser adapted to be charged by said shaped impulses, a plurality of electronic valves each having a logarithmic response characteristic and each controlled by the charge on a corresponding one of said condensers for operating a load device in accordance with the extent of said charge thereon.

2. A ratemeter system comprising means to form shaped impulses of uniform amplitude in response to energizing impulses applied on the system, a plurality of condensers adapted to be charged by said shaped impulses, a plurality of electronic valves each having a logarithmic response characteristic and each controlled by the charge on a corresponding one of said condensers, for operating a load device in accordance with the extent of said charges, said valves having output circuits connected in parallel relation and with said load device and also having control grids connected each with a corresponding one of said condensers, and means to bias said valves to cut-off at predetermined voltage values of the charges on the condensers.

3. A ratemeter system comprising a shaper-amplifier to which energizing impulses may be applied, said shaper-amplifier embodying electronic valve means for delivering shaped impulses of uniform amplitude, a plurality of integrating circuits coupled to said shaper-amplifier, each of said integrating circuits embodying a condenser adapted to be charged in proportion to the rate at which said shaped impulses are received thereby, said condensers each being charged at a charging rate different from the charging rate of the other condensers, and an electronic valve connected to each of said condensers, each of said valves including a control grid and a plate, and possessing a logarithmic transfer characteristic, the plates of said valves being connected in parallel and to a load device operable in response to the plate currents of said valves to indicate the rate at which energizing impulses are applied to the system.

4. A ratemeter system comprising shaping means to form shaped impulses of uniform amplitude in response to energizing impulses applied on the system, a plurality of integrating circuits coupled with said means, each of said circuits embodying a condenser adapted to be charged in response to shaped impulses received thereby from said shaping means, said condensers having unlike charging rates, and an electronic valve connected to each of said condensers, each of said valves having a control grid and a plate, and having logarithmic transfer characteristics, and means to bias said valves to cut-off at predetermined voltage values of the charges on the condensers with which the same are respectively connected.

5. A ratemeter system comprising shaping means to form shaped impulses of uniform amplitude in response to energizing impulses applied on the system, a plurality of integrating circuits coupled with said means, each of said circuits embodying a condenser adapted to be charged in response to shaped impulses received thereby from said shaping means, said condensers having unlike charging rates, and an electronic valve connected to each of said condensers, each of said valves having a control grid and a plate, and having logarithmic transfer characteristics, the plates of said valves being connected in parallel and with a load device operable in response to the plate currents of said valves, to indicate the rate at which energizing impulses are applied to the system.

6. A ratemeter system comprising shaping means to form shaped impulses of uniform amplitude in response to energizing impulses applied on the system, a plurality of integrating circuits connected to said impulse shaping means, each of said integrating circuits comprising a polarity reversing diode and a condenser adapted to be charged by said shaped impulses applied thereto through said diode, and a plurality of electronic valves, each having a logarithmic response characteristic and each controlled by the charge on a corresponding one of said condensers for operating a load device in accordance with the extent of said charge thereon.

JOHN E. JACOBS.

REFERENCES CITED

The following references are of record in the file of this patent:

UNITED STATES PATENTS

| Number | Name | Date |
|---|---|---|
| 2,066,284 | Ballantine | Dec. 29, 1936 |
| 2,260,933 | Cooper | Oct. 28, 1941 |
| 2,403,615 | Sanders | July 9, 1946 |
| 2,445,800 | Mortlock | July 27, 1948 |
| 2,457,819 | Hoeppner | Jan. 4, 1949 |

OTHER REFERENCES

Article—"A Direct-Reading Counting Rate Meter for Random Pulses" by Gingrich et al.—pages 450–456 of RSI—vol. 7 for December 1936.